US012152572B2

(12) United States Patent
Van de Ven et al.

(10) Patent No.: US 12,152,572 B2
(45) Date of Patent: Nov. 26, 2024

(54) INTEGRATED ELECTRIC-TO-HYDRAULIC CONVERSION MACHINE

(71) Applicants: Regents of the University of Minnesota, Minneapolis, MN (US); WISCONSIN ALUMNI RESEARCH FOUNDATION, Madison, WI (US)

(72) Inventors: James Van de Ven, Minneapolis, MN (US); Garrett Bohach, Minneapolis, MN (US); Nishanth, Madison, WI (US); Eric Severson, Middleton, WI (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 219 days.

(21) Appl. No.: 17/629,909

(22) PCT Filed: Aug. 14, 2020

(86) PCT No.: PCT/US2020/046323
§ 371 (c)(1),
(2) Date: Jan. 25, 2022

(87) PCT Pub. No.: WO2021/034642
PCT Pub. Date: Feb. 25, 2021

(65) Prior Publication Data
US 2022/0252058 A1    Aug. 11, 2022

Related U.S. Application Data

(60) Provisional application No. 62/887,718, filed on Aug. 16, 2019.

(51) Int. Cl.
*F04B 17/03*    (2006.01)
*F04B 1/0452*    (2020.01)
(Continued)

(52) U.S. Cl.
CPC ............ *F04B 17/03* (2013.01); *F04B 1/0452* (2013.01); *F04B 7/0007* (2013.01);
(Continued)

(58) Field of Classification Search
CPC .... F04B 1/0452; F04B 1/0472; F04B 1/1071; H02K 1/2793; H02K 1/2796; H02K 1/2798; H02K 16/02
(Continued)

(56) References Cited

U.S. PATENT DOCUMENTS

2004/0234399 A1* 11/2004 Lopatinsky ............. F04D 5/002
417/423.1
2015/0033938 A1    2/2015 Erlston et al.
2019/0154036 A1    5/2019 Nieuwenhuis

FOREIGN PATENT DOCUMENTS

EP    2461465 A1    6/2012
JP    2011172385 A   9/2011
(Continued)

OTHER PUBLICATIONS

Atarashi et al., 'Axial Gap Motor'—(17629909_2023-11-16_WO_2008068977_A1_M.pdf), Oct. 2007 (Year: 2007).*
(Continued)

*Primary Examiner* — Kenneth J Hansen
(74) *Attorney, Agent, or Firm* — Brian D. Kaul; Westman, Champlin & Koehler, P.A.

(57) ABSTRACT

An electric-to-hydraulic conversion machine includes an axial flux electric motor and a hydraulic pump. The motor includes a spindle, at least one rotor configured to rotate about the spindle, and at least one stator configured to drive rotation of the at least one rotor about the spindle. The hydraulic pump includes a piston block having a plurality of cylinders, a plurality of pistons each supported in one of the cylinders of the piston block, and a cam ring. The piston
(Continued)

block is attached to the at least one rotor and is configured to rotate about the spindle with rotation of the at least one rotor. The cam ring is configured to radially drive the pistons during rotation of the piston block about the spindle, which drives a fluid flow.

12 Claims, 5 Drawing Sheets

(51) Int. Cl.
    *F04B 1/0472*     (2020.01)
    *F04B 7/00*     (2006.01)
    *H02K 1/2798*     (2022.01)
    *H02K 7/14*     (2006.01)
    *H02K 16/02*     (2006.01)
    *H02K 21/24*     (2006.01)

(52) U.S. Cl.
    CPC ............. *H02K 1/2798* (2022.01); *H02K 7/14* (2013.01); *H02K 16/02* (2013.01); *H02K 21/24* (2013.01); *F04B 1/0472* (2013.01)

(58) Field of Classification Search
    USPC ........................................ 310/156.32–156.37
    See application file for complete search history.

(56) References Cited

FOREIGN PATENT DOCUMENTS

WO     WO-2008068977 A1 *   6/2008   ........... H02K 1/2793
WO     WO-2017192036 A1 *   11/2017   ............ F04B 1/0456

OTHER PUBLICATIONS

International Search Report and Written Opinion of PCT/US2020/046323 mailed Jan. 20, 2021, 14 pages.

F. Nishanth, G. Bohach, J. V. de Ven and E. L. Severson, "Design of a Highly Integrated Electric-Hydraulic Machine for Electrifying Off-Highway Vehicles," 2019 IEEE Energy Conversion Congress and Exposition (ECCE), 2019, pp. 3983-3990, doi: 10.1109/ECCE.2019.8912685.

* cited by examiner

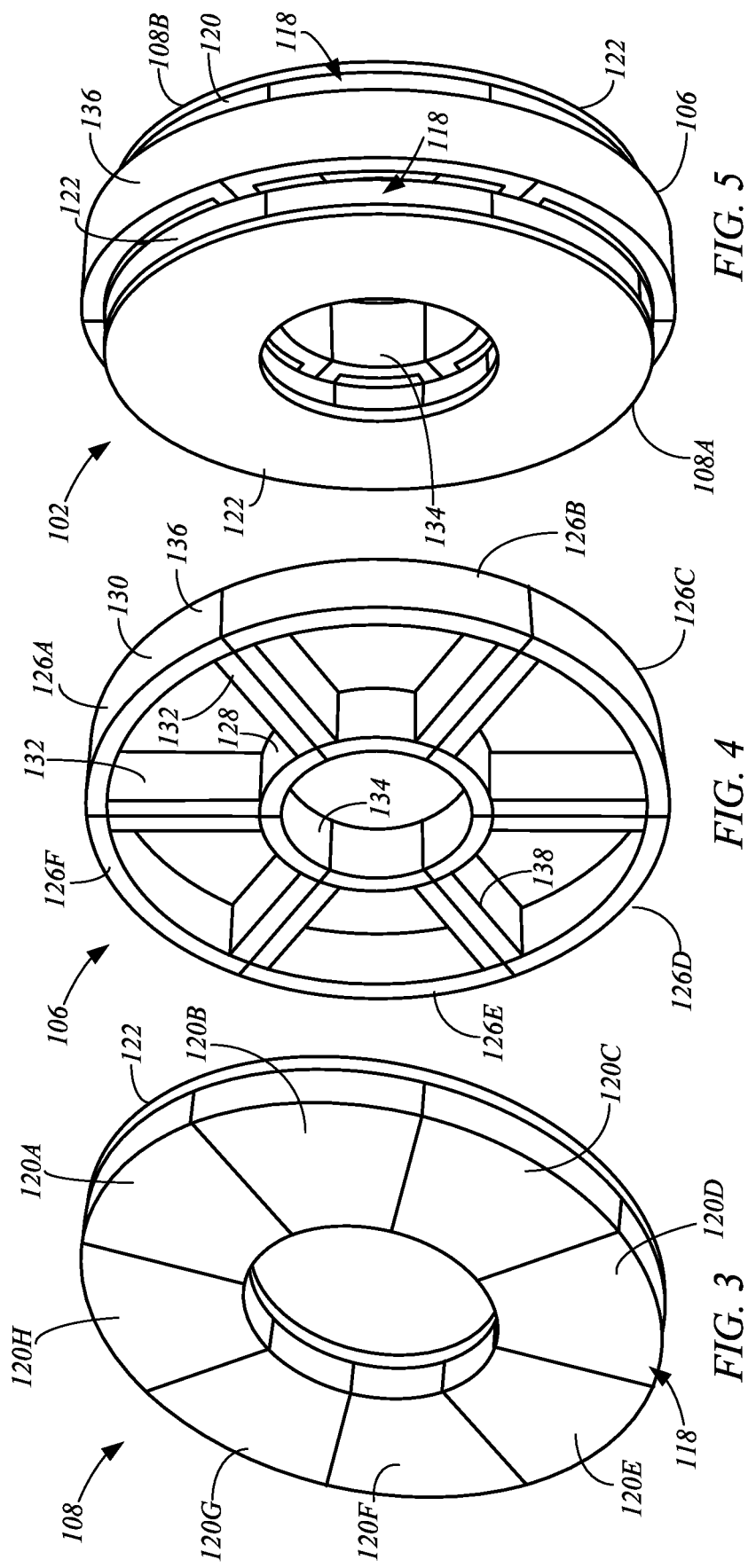

INTEGRATED ELECTRIC-TO-HYDRAULIC CONVERSION MACHINE

CROSS-REFERENCE TO RELATED APPLICATION

This Application is a Section 371 National Stage Application of International Application No. PCT/US2020/046323, filed Aug. 14, 2020 and published as WO 2021/034642 A1 on Feb. 25, 2021, in English, which is based on and claims the benefit of U.S. provisional patent application Ser. No. 62/887,718, filed Aug. 16, 2019, the contents of which are hereby incorporated by reference in their entirety.

GOVERNMENT FUNDING

This invention was made with government support under contract number DE-EE0008384 awarded by the Department of Energy. The government has certain rights in the invention.

FIELD

Embodiments of the present disclosure generally relate to an integrated electric-to-hydraulic conversion machine and, more particularly, to an electric-to-hydraulic conversion machine that utilizes an axial flux electric motor.

BACKGROUND

Depleting fossil fuel reserves, growing concern about global warming, and increasingly stringent air quality regulations are spurring interest in the electrification of off-highway vehicles, such as excavators and agriculture equipment. Legacy systems rely on hydraulic power transmission, which suffer from significant throttling and component losses. It is estimated that the efficiency from the engine shaft to the implement is only 21%. Further, the typical drive cycle of an off-highway vehicle is highly transient in nature, offering substantial opportunities for energy recovery. Electrification of these systems would enable enormous energy savings by eliminating sources of losses and enabling energy recovery.

However, the extreme power density and transient requirements of these vehicles pose unique challenges that cannot be solved by using the electric drivetrain technology developed for passenger vehicles. There is a need for hybrid hydraulic-electric systems in off-highway vehicles to exploit the benefits of both the hydraulic domain (high power density) and electric domain (elimination of throttle losses, high component efficiency, controllability).

SUMMARY

Embodiments of the present disclosure are generally directed to integrated electric-to-hydraulic conversion machines that combine a rotor of an axial flux machine with a hydraulic pump, and a method of operating the machine, such as while being supported on a motor vehicle. One embodiment of the electric-to-hydraulic conversion machine includes an axial flux electric motor and a hydraulic pump. The axial flux electric motor includes at least one spindle, at least one rotor configured to rotate about the spindle, and at least one stator configured to drive rotation of the at least one rotor about the spindle. The hydraulic pump includes a piston block including a plurality of cylinders, a plurality of pistons, and a cam ring. The piston block is attached to the at least one rotor and is configured to rotate about the spindle with rotation of the at least one rotor. Each of the plurality of pistons is supported in one of the cylinders of the piston block. The cam ring is configured to radially drive the pistons during rotation of the piston block about the spindle, which drives a fluid flow. The fluid flow may be used to operate a hydraulic tool, for example.

In one embodiment of a method of operating an electric-to-hydraulic conversion machine, the electric-to-hydraulic conversion machine is provided and includes an axial flux electric motor and a hydraulic pump. The axial flux electric motor includes a spindle, and a rotor and stator configuration. The rotor and stator configuration includes a first rotor and stator configuration comprising a rotor, and a stator configured to drive rotation of the rotor about the spindle, a second rotor and stator configuration comprising a pair of rotors, and a stator between the pair of rotors configured to drive rotation of the pair of rotors about the spindle, or a third rotor and stator configuration comprising a pair of stators and a rotor between the pair of stators, the pair of stators configured to drive rotation of the rotor about the spindle. The hydraulic pump includes a piston block having a plurality of cylinders, a plurality of pistons, and a cam ring. The piston block is attached to one of the rotors of the first, second, or third rotor and stator configuration, and is configured to rotate about the spindle with rotation of the attached rotor. Each of the plurality of pistons is supported in one of the cylinders of the piston block. The cam ring is configured to radially drive the pistons during rotation of the piston block about the spindle. In response to providing electrical power to the axial flux electric motor, rotation of the rotor of the first rotor and stator configuration, rotation of the pair of rotors of the second rotor and stator configuration, or rotation of the rotor of the third rotor and stator configuration is driven about the spindle. A fluid flow is generated by driving the pistons within the cylinders using the cam ring.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 3 is an isometric view of an exemplary rotor, in accordance with embodiments of the present disclosure.

FIG. 4 is an isometric view of an exemplary stator, in accordance with embodiments of the present disclosure.

FIG. 5 is a simplified isometric view of an assembled electric motor, in accordance with embodiments of the present disclosure.

DETAILED DESCRIPTION OF ILLUSTRATIVE EMBODIMENTS

Figure 1:
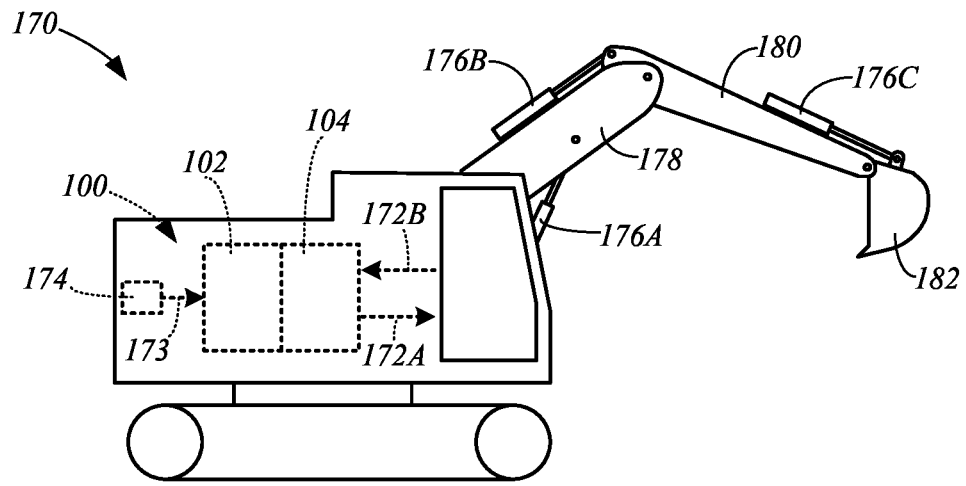
FIG. 1 is a simplified side view of an exemplary electric-to-hydraulic conversion machine supported on a motor vehicle, in accordance with embodiments of the present disclosure

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced by those skilled in the art without these specific details. For example, circuits, systems, networks, processes, frames, supports, connectors, motors, processors, and other components may not be shown, or shown in block diagram form in order to not obscure the embodiments in unnecessary detail.

Embodiments of the present disclosure are directed to an electric-to-hydraulic conversion machine that may be suitable for many different applications requiring hydraulic actuators and mechanisms, such as in motor vehicles (e.g., off-highway vehicles), robotics, and stationary systems, to exploit the benefit of both hydraulic and electric domains.

FIG. 1 is a simplified side view of an example of an electric-to-hydraulic conversion machine 100, in accordance with embodiments of the present disclosure. The machine 100 includes an axial flux electric motor 102 having an integrated hydraulic pump 104. The integration of the motor 102 with the hydraulic pump 104 eliminates redundant bearings, seals, and points of energy conversion. Furthermore, the hydraulic fluid is easily utilized to cool the electric machine and associated drive electronics, allowing high electric loading. All of this translates to highly desirable benefits of low inertia, high power density, and high electric-hydraulic energy efficiency, relative to conventional motor vehicle hydraulic systems.

The hydraulic pump 104 may be used to generate one or more fluid flows (e.g., hydraulic fluid flows), such as fluid flows 172A and/or 172B, which may be identical, in response to driving the axial flux electric motor 102 using electrical power 173, such as from a battery 174. Controllers, circuits and other conventional electronics for powering and controlling the motor 102 are not shown in order to simplify the illustration. Additionally, the machine 100 may be driven in a generator mode, in which the hydraulic fluid flows from the hydraulic pump 104 drive the motor 102 in a generator mode to generate electrical energy. The generated electrical energy may be used to charge the battery 174 or used for another purpose.

In the example of FIG. 1, the machine 100 is supported on a motor vehicle 170, in accordance with embodiments of the present disclosure. Additional embodiments include the use of the machine in a robotic or other system having hydraulic actuators.

The motor vehicle 170 may take on any suitable form, and the generated fluid flows may be used to drive or operate one or more hydraulic actuators 176 (e.g., hydraulic cylinders or hydraulic motors) of the vehicle 170. For example, the motor vehicle 170 provided in FIG. 1 may be an excavator. Hydraulic actuators 176A-C may be operated using the flows 172A and/or 172B to respectively operate a boom 178, a stick 180 and/or a bucket 182 of the vehicle 170. Additional examples of the motor vehicle 170 include graders, crawlers, dump trucks, aircraft, automobiles (e.g., hydraulic brake systems), and other motor vehicles that may benefit from the electric-to-hydraulic conversion machine 100 of the present disclosure.

Figure 2:
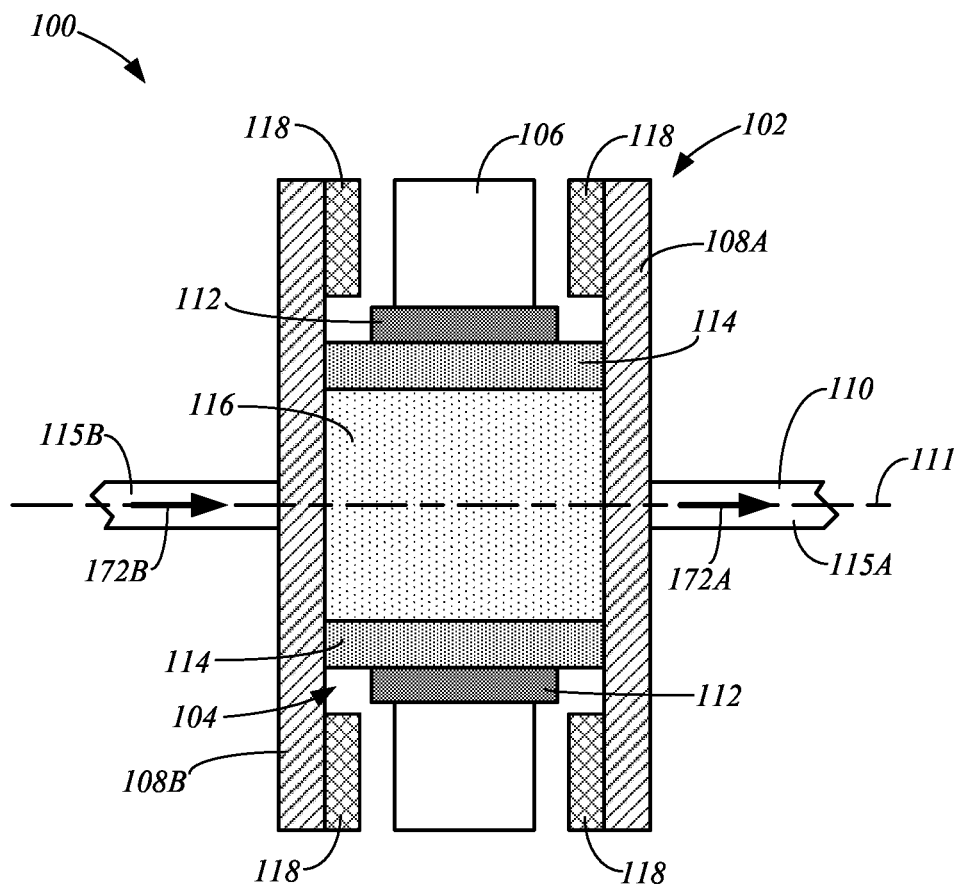
FIG. 2 is a simplified side view of an exemplary electric-to-hydraulic conversion machine, in accordance with embodiments of the present disclosure.

FIG. 2 is a simplified side view of the exemplary electric-to-hydraulic conversion machine 100, in accordance with embodiments of the present disclosure. In some embodiments, the electric motor 102 is in the form of an axial flux synchronous machine. The electric motor 102 may operate in a conventional manner. In one embodiment, the motor 102 includes at least one stator 106 and at least one rotor 108, such as a single stator and a single rotor, multiple stators and a single rotor, or multiple rotors and a single stator. The stator 106 is configured to drive rotation of the at least one rotor 108 about a hollow spindle 110 having a spindle axis 111 using electrical power. In some embodiments, the stator 106 is positioned between a pair of rotors 108A and 108B, as shown in FIG. 2.

One embodiment of the hydraulic pump 104 includes a stationary cam ring 112, which may be attached to the stator 106, a piston block 114 that is attached to the rotor 108, and a stationary distributor valve 116. The rotation of the piston block 114 about the axis 111 of the spindle 110 with the rotors 108 drives pistons within the piston block 114, which in turn drives a fluid flow 172A from the piston block 114 through a fluid flow pathway of a first side 115A of the hollow spindle 110 and a fluid flow 172B from a fluid flow pathway of a second side 115B of the spindle 110 to the piston block 114, as indicated in FIG. 2.

The one or more stator 106 and the rotors 108 may take on any suitable form. In one embodiment, the rotor 108 includes a rotor drive 118 that interacts with the stator 106 to drive rotation of the rotor 108 about the spindle 110, in accordance with conventional axial flux electric motors.

Isometric views of an exemplary rotor 108 and stator 106 for the machine 100 of FIG. 1 are respectively shown in FIGS. 3 and 4. The rotor drive 118 may take on any suitable form. In some embodiments, the rotor drive 118 includes permanent magnets 120, such as permanent magnets 120A-H, and an iron base plate 122, as shown in FIG. 3.

Alternatively, each rotor 108 may comprise a rotor drive 118 in the form of a Halbach array for the permanent magnets 120 to allow for a coreless design, and eliminate the need for the iron base plate 122. This reduces the thickness and the mass of the rotors 108, thereby reducing rotor inertia.

In yet another embodiment, the motor 102 may be an induction motor, in which the permanent magnets 120 of the rotor drive 118 of FIG. 3 are replaced with conductive bars or coils. In addition, the electric motor 102 may be in the form of a reluctance machine, in which each rotor 108 takes the form of a synchronous reluctance rotor having, for example, a rotor drive 118 that includes a ferromagnetic material (e.g., iron) having a salient shape that forms non-permanent magnetic poles.

The stator 106 may be coreless and comprise multiple conductive coils 126, such as coils 126A-F, as shown in FIG. 4. In one embodiment, each of the coils 126 includes a hub portion 128, an outer ring portion 130 and a pair of spokes 132, as indicated for coil 126A. The coils 126 may each receive an electric current for driving the rotors 108 about the spindle 110, using conventional techniques. One embodiment of the assembled stator 106 includes a central hub 134 formed by the hub portions 128, an outer ring 136 formed by the outer ring portions 130, and a plurality of spokes 138 formed by the spokes 132. Other configurations for the stator 106 may also be used, such as a toroid winding around an iron core, for example.

FIG. 5 is a simplified isometric view of the assembled motor 102, in accordance with embodiments of the present disclosure. In one embodiment, the stator 106 is positioned between the rotors 108A and 108B with the iron bases 122 positioned on the outside. The rotors 108 may be connected together using any suitable means, such as through the piston block 114, for example. Bearings, seals (e.g., interface seals, clearance seals, etc.), wiring and other conventional motor components may be used to complete the formation of the electric motor 102, as understood by those skilled in the art.

One advantage to the configuration of the machine of FIG. 2 and the exemplary stator 106 and rotors 108, is that the diameter of the stator 106 and the rotors 108 may be adjusted to provide the desired power characteristics without having to adjust the diameter of the piston block 114. Thus, various machines 100 may be formed having electric motors 102 with various power ratings, while using substantially the same piston block 114, which simplifies the manufacture of customized versions of the machine 100.

Figure 6:
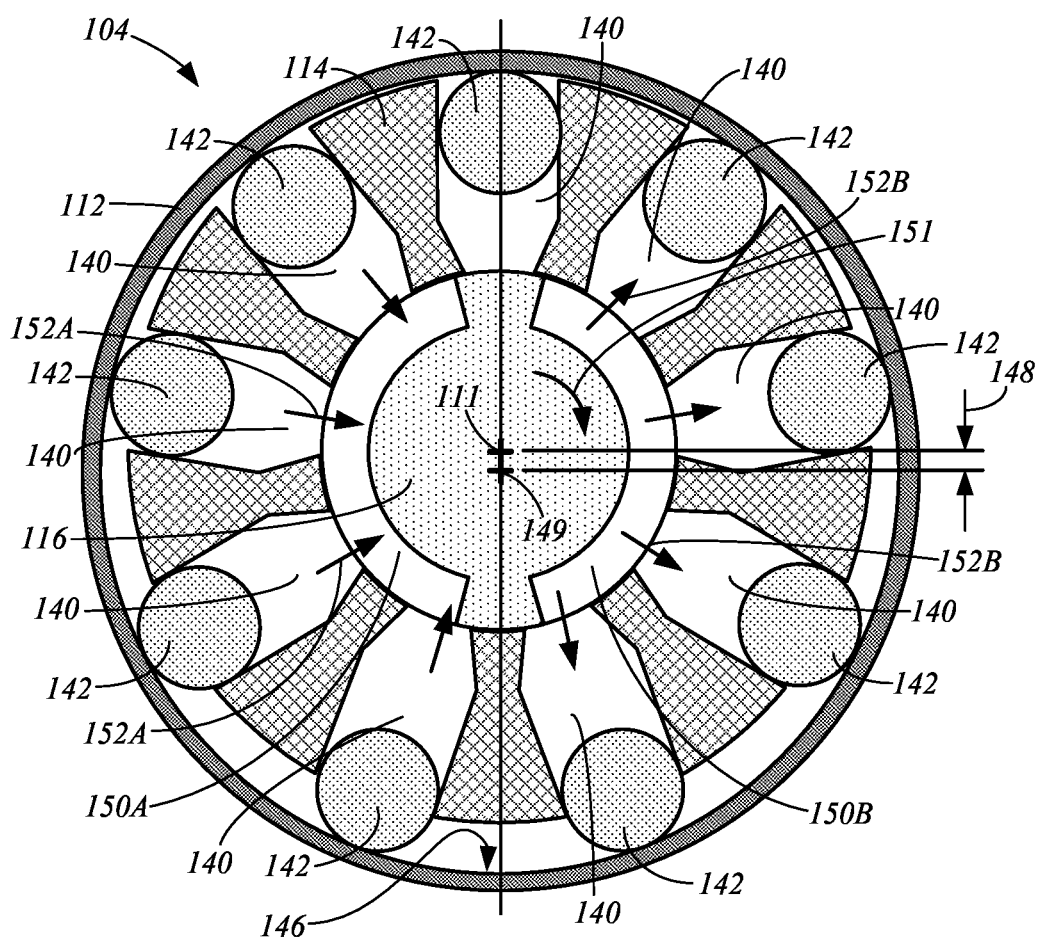
FIG. 6 is a simplified cross-sectional view of an exemplary hydraulic pump 104, in accordance with embodiments of the present disclosure.

FIG. 6 is a simplified cross-sectional view of an exemplary hydraulic pump 104, in accordance with embodiments of the present disclosure. The pump 104 of FIG. 6 includes an exemplary cam ring 112 and an exemplary piston block 114, in accordance with embodiments of the present disclosure.

The piston block 114 may include a plurality of cylinders 140, and a piston 142 in each of the cylinders 140. The pistons 142 may each be biased radially away from the spindle axis 111 using any suitable technique, such as a spring, for example. The pistons 142 may take on any suitable form, such as ball pistons (as shown), cylindrical pistons, roller pistons, or other suitable pistons.

As mentioned above, the piston block 114 is attached to the rotors 108 and is configured to rotate about the spindle axis 111 with rotation of the rotors 108. Any suitable fastening technique may be used to attach the piston block 114 to the rotors 108. For example, the piston block may be attached to the base 122, such as the central portion of the base 122 (FIGS. 3 and 5), or another structure of the rotors 108, or a structure that is attached to the rotors 108.

The cam ring 112 may be attached to the interior of the central hub 134 (FIG. 4) of the stator 106 (FIG. 2), and includes an interior wall 146 having one or more lobes for driving the pistons 142 radially relative to the piston block 114 during rotation of the piston block 114 about the spindle axis 111. The exemplary cam ring 112 shown in FIG. 6 includes a single lobe that creates an eccentricity 148 between the spindle axis 111, about which the piston block 114 rotates, and a central axis 149 of the cam ring 112. Thus, during rotation of the piston block 114 about the spindle axis 111, the interior wall 146 drives the pistons 142 to varying radial positions relative to the axis 111 and the cylinders 140, to drive the fluid flows 172A and 172B (FIG. 2).

In some embodiments, the pump 104 of the distributor valve 116 is attached to the spindle 110 and has a fixed position relative to the stator 106 and the cam ring 112. In one embodiment, the distributor valve 116 includes a first port 150A in fluid communication with the pathway 115A, and a second port 150B in fluid communication with the pathway 115B. During rotation of the cylinder block 114 about the axis 111 in the direction indicated by arrow 151 relative to the cam ring 112, the distributor valve 116 receives fluid flows 152A from the cylinders 140, in which the pistons 142 are driven toward the spindle axis 111 by the cam ring 112, and directs the aggregate fluid flow through the port 150A as the fluid flow 172A. Also, during rotation of the cylinder block 114, due to the bias applied to the pistons 142, some of the pistons 142 are driven away from the axis 111 and toward the cam ring 112, which drives fluid flow portions 152B into the cylinders 142 and generates the fluid flow 172B.

The cam ring 112 may also include multiple lobes for multi-cycle driving of the pistons 142 toward and away from the spindle axis 111. In this case, the distributor valve 116 may include multiple ports 150 for handling the fluid flows to and from the cylinders 140, and the spindle 110 may correspondingly include multiple fluid flow pathways.

Figure 7:
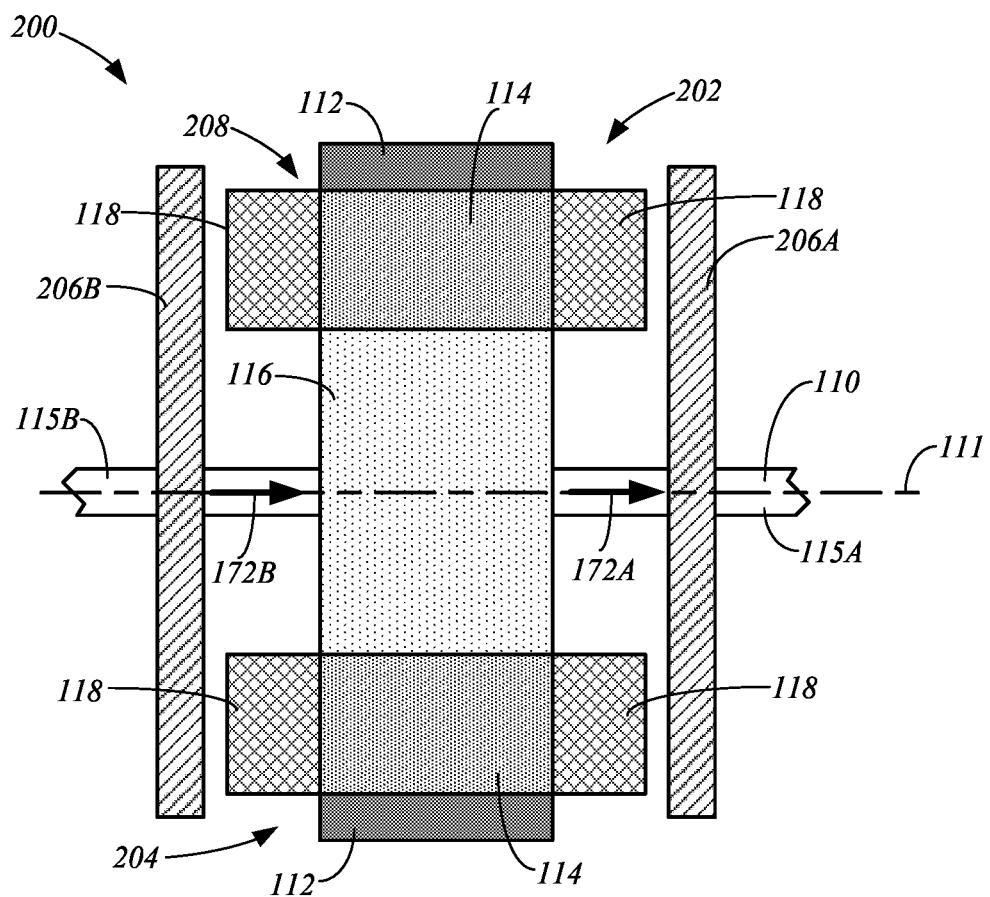
FIG. 7 is a simplified side view of an exemplary electric-to-hydraulic conversion machine, in accordance with embodiments of the present disclosure.

FIG. 7 is a simplified side view of an exemplary electric-to-hydraulic conversion machine 200, in accordance with embodiments of the present disclosure. The machine 200 may, for example, replace the machine 100 on the vehicle 170 shown in FIG. 1. As with the machine 100, the machine 200 includes an axial flux electric motor 202 having an integrated hydraulic pump 204. As with the motor 102, the motor 202 includes at least one stator 206 and at least one rotor 208. In one embodiment, the motor 202 of the machine 200 includes a stators 206A and 206B, and a single rotor 208 sandwiched between the stators 206. Alternatively, the motor 202 may include one of the stators 206A or 206B, and the single rotor 208, or a single stator between a pair of rotors (FIG. 2).

The hydraulic pump 204 includes a piston block 114 that may be formed in accordance with one or more embodiments described above, and may be attached at an outer diameter of the rotor 208, as indicated in FIG. 7.

Elements of the machine 200 that are referenced by the same or similar numbers correspond to the same or similar elements, and are configured in accordance with one or more embodiments described above. Thus, the motor 202 may be configured as an axial flux permanent magnet synchronous machine, an induction machine, or a reluctance machine, based on the choice of the rotor drive 118, for example. In the embodiment, the cam ring 112 is stationary relative to the rotator 208 and may be attached to the stator 206A and/or the stator 206B.

The machine 200 generally operates in the same manner as the machine 100 by driving the fluid flows 172A and 172B in response to the rotation of the piston block 114 about the spindle axis 111 relative to the cam ring 112 (FIG. 6).

Figure 8:
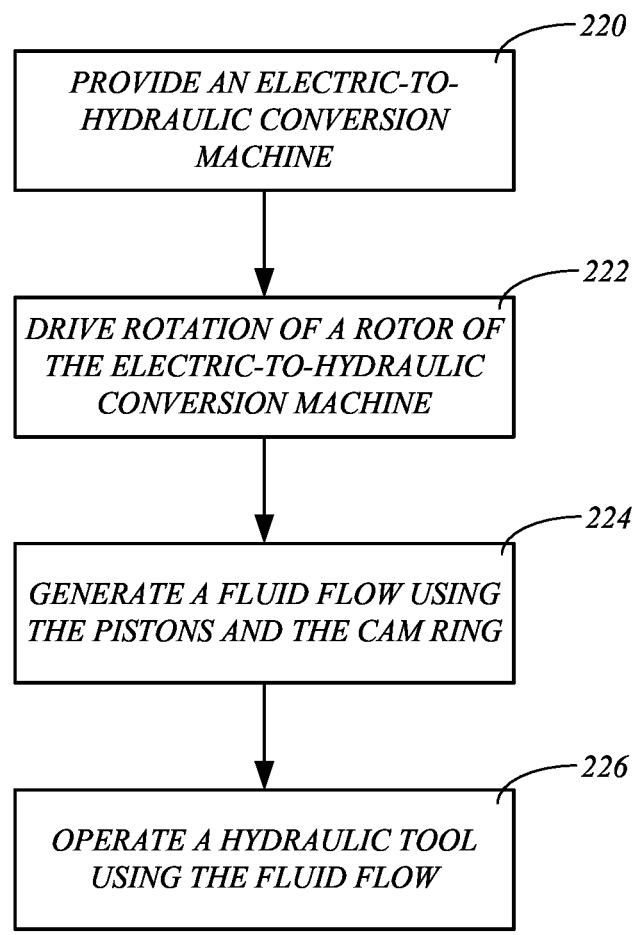
FIG. 8 is a flowchart illustrating a method of operating the electric-to-hydraulic machine, in accordance with embodiments of the present disclosure.

FIG. 8 is a flowchart illustrating a method of operating the electric-to-hydraulic machine 100 or 200, in accordance with embodiments of the present disclosure. At 220 of the method, the electric-to-hydraulic conversion machine 100 or 200 formed in accordance with one or more embodiments described herein, is provided. At 222, rotation of the rotor 106 (FIG. 2), or the pair of rotors 206A and 206B (FIG. 7), is driven in response to providing electrical power to the axial flux electric motor 102 or 202, which in turn drives rotation of the piston block 114 about the spindle axis 111. The electrical power may be provided from a battery 174 (FIG. 1) or another suitable source.

At 224 of the method, a fluid flow is generated in response to step 222, such as the fluid flow 172A or 172B (FIGS. 1, 2 and 7), using the pistons 142 and the cam ring 112. As discussed above, during the rotation step 222, the pistons 142 are driven either toward or away from the axis 111 by the cam ring 112, which generates the fluid flows 172A or 172B. In some embodiments, a distributor valve 116 (FIG. 6) directs fluid flows 152A from the cylinders 140 to form the fluid flow 172A, and/or drives fluid flows 152B into the cylinders 140 of the fluid flow 172B to the cylinders to generate the fluid flows 172A and 172B. As indicated at 226, the generated fluid flow may be used to operate a hydraulic tool.

The method of FIG. 8 may also be essentially reversed to operate the machine 100 or 200 in a generator mode, as mentioned above. Here, the fluid flows 152B are used to drive the pistons 142, which in turn drives rotation of the piston block 114 about the spindle axis 111. This rotation of the piston block 114 drives rotation of the one or more rotors 106 (FIG. 2) or 206 (FIG. 7) relative to the one or more stators, and generates electrical energy, which may be used, for example, to charge the battery 174 or used for another purpose.

Some embodiments of the present disclosure are directed to a mobile vehicle 170 that supports the electric-to-hydraulic machine 100 or 200 and uses the one or more fluid flows 172 to operate one or more hydraulic actuators 176, such as shown in the example of FIG. 1. Accordingly, in one embodiment of the method, the machine 100 or 200 is supported on a motor vehicle 170 and, at 226, and a hydraulic actuator 176, is operated in response to the fluid flow 172A and/or 172B generated in step 224. This operation may involve changing a position of a piston within a hydraulic cylinder of the actuator 176, for example. Additionally, this operation of the hydraulic actuator 176 may be used to drive a hydraulic tool, such as a boom 178, a stick 180, or a bucket 182, which are shown in FIG. 1. Other types of hydraulic tools of a motor vehicle may also be driven through the operation of the hydraulic actuator.

Although the embodiments of the present disclosure have been described with reference to preferred embodiments, workers skilled in the art will recognize that changes may be made in form and detail without departing from the spirit and scope of the present disclosure.

What is claimed is:

1. An electric-to-hydraulic conversion machine comprising:
   an axial flux electric motor comprising:
      a spindle;
      a first rotor configured to rotate about the spindle; and
      a first stator configured to drive rotation of the first rotor about the spindle; and
   a hydraulic pump comprising:
      a piston block including a plurality of cylinders, the piston block attached to the first rotor and configured to rotate about the spindle with rotation of the first rotor;
      a plurality of pistons, each cylinder containing one of the pistons; and
      a cam ring configured to radially drive the pistons during rotation of the piston block about the spindle, which drives a fluid flow for operating a hydraulic tool,
   wherein:
      the axial flux electric motor comprises a second rotor configured to rotate about the spindle; and
      the first stator is positioned between the first and second rotors, and is configured to drive rotation of the second rotor about the spindle.

2. The machine of claim 1, wherein the electric motor includes rotor drives attached to the first rotor, each rotor drive selected from the group consisting of permanent magnets, conductive bars, conductive coils, and non-permanent magnet poles.

3. The machine of claim 2, wherein each rotor drive comprises a Halbach array of permanent magnets.

4. The machine of claim 1, wherein the first rotor comprises a plurality of permanent magnets attached to an iron disc.

5. The machine of claim 1, wherein the hydraulic pump includes a distributor valve configured to direct fluid flows between the cylinders and first and second fluid flow pathways of the spindle.

6. The machine of claim 1, wherein the cam ring is attached to the stator and includes one or more lobes.

7. The machine of claim 1, wherein the first stator is coreless.

8. The machine of claim 7, wherein the first stator comprises a plurality of conductive coils, each having a hub portion, an outer ring portion and a pair of spokes connecting the hub portion to the outer ring portion.

9. The machine of claim 8, wherein the hub portions of the plurality of coils form a central hub, and the cam ring is received within an interior of the central hub.

10. The machine of claim 1, wherein the first stator comprises a toroid winding around a core.

11. A method of operating an electric-to-hydraulic conversion machine comprising:
   providing the electric-to-hydraulic conversion machine comprising:
      an axial flux electric motor comprising:
         a spindle; and
         a pair of rotors, and a stator between the pair of rotors configured to drive rotation of the pair of rotors about the spindle; and
      a hydraulic pump comprising:
         a piston block including a plurality of cylinders, the piston block attached to one of the rotors and configured to rotate about the spindle with rotation of the attached rotor;
         a plurality of pistons, each cylinder containing one of the pistons; and
         a cam ring configured to radially drive the pistons during rotation of the piston block about the spindle;
   driving rotation of the pair of rotors about the spindle in response to providing electrical power to the axial flux electric motor;
   and
   generating a fluid flow comprising driving the pistons within the cylinders using the cam ring.

12. The method of claim 11, wherein the hydraulic pump includes a distributor valve configured to direct fluid flows between the cylinders and first and second fluid flow pathways of the spindle.

* * * * *